A. MASTER.
FRICTION CLUTCH.
APPLICATION FILED JAN. 9, 1911.

997,073.

Patented July 4, 1911.

Witnesses
E. Larson
S. E. Dodge

Inventor
A. Master
By Bellers Robb
Attorneys

COLUMBIA PLANOGRAPH CO., WASHINGTON, D. C.

UNITED STATES PATENT OFFICE.

ALBERT MASTER, OF PARK RIDGE, ILLINOIS.

FRICTION-CLUTCH.

997,073. Specification of Letters Patent. Patented July 4, 1911.

Application filed January 9, 1911. Serial No. 601,651.

*To all whom it may concern:*

Be it known that I, ALBERT MASTER, a subject of the King of Great Britain, residing at Park Ridge, in the county of Cook and State of Illinois, have invented certain new and useful Improvements in Friction-Clutches, of which the following is a specification.

This invention relates to friction clutches and has particular reference to certain specific novel features of construction hereinafter fully described and claimed and illustrated in the accompanying drawings, in which:—

Figure 1:
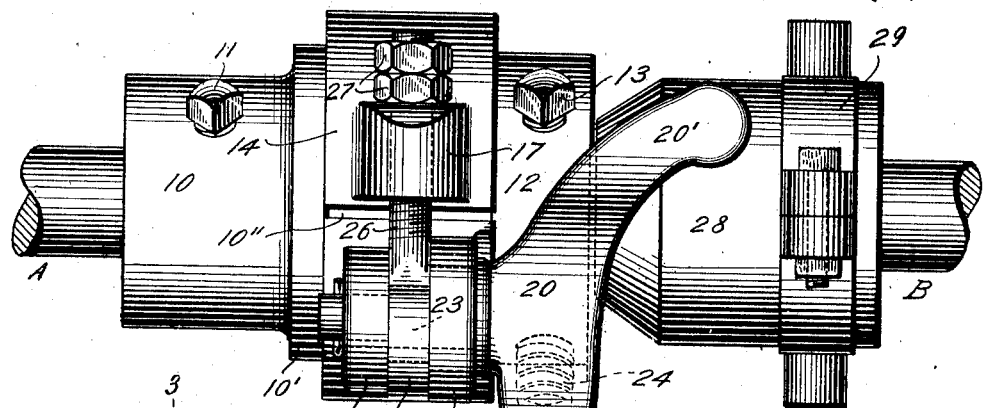
Figure 2:
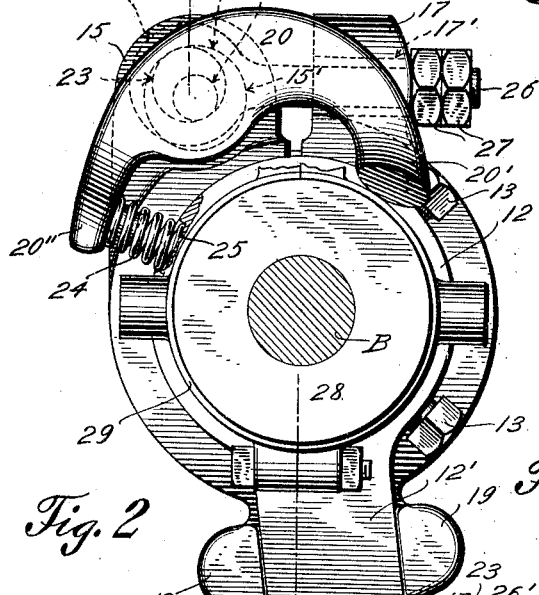
Figure 4:
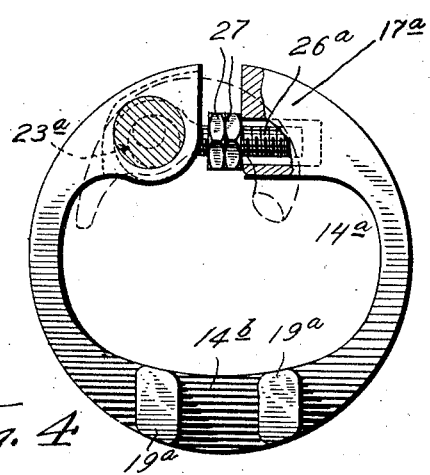
Figure 5:
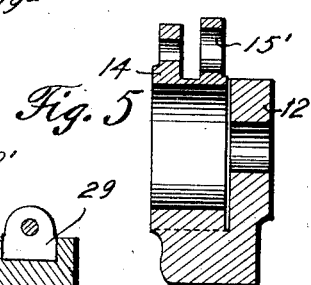
Figure 3:
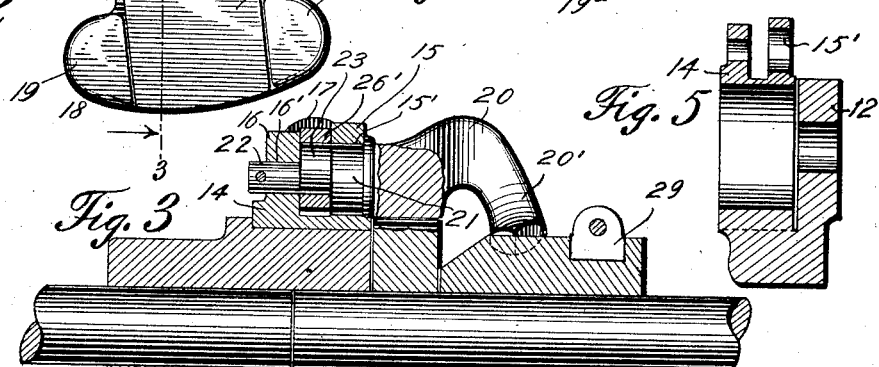

Figure 1 is a plan view of the clutch; Fig. 2 is an end elevation of the same; Fig. 3 is a vertical longitudinal section; Fig. 4 is a detail view of a modification, and Fig. 5 is a detail view of a still further modification.

Throughout the following description and on the several figures of the drawings similar parts are referred to by like reference characters.

As indicated a pair of shaft sections A and B, which may be considered the driving and driven shafts, respectively, are arranged with their adjacent ends substantially in contact and coaxial. Either of the two may be referred to however as the driving shaft. The hub 10 is rigidly connected to the driving shaft as by a set screw 11, and said element may be a pulley or any other form of driving element. The hub 10 is provided with a flange 10' adjacent to which is a cylindrical clutch face 10''. The portion of the hub having the clutch face 10'' extends preferably far enough beyond the shaft end A to receive the end of the other shaft and thereby constitute a supporting or steadying means for the last shaft.

The shaft B has rigidly connected to it a collar 12, as by means of a set screw 13, and just adjacent the outer end of the hub 10. A clutch ring or strap 14 normally loosely surrounds the surface 10'' of the hub 10, the width of the ring being substantially equal to the length of said clutch face. Said ring is of spring material and the normal tendency thereof is to expand and be loose upon the hub. Said ring is split and is provided at one end with a pair of spaced ears 15 and 16, having bores of unequal diameter but coaxial, said bores being indicated at 15' and 16'. The other end of the split ring is provided with a hub 17 and said hub has a hole 17' passing therethrough and directed toward the space between said ears. The ring 14, furthermore, is provided on the side diametrically opposite from the split portion with a radial projection 18 from which extend a pair of lugs 19 substantially parallel with the axis of the shafts. The collar 12 is provided with a radial extension 12' which substantially fills the space between the aforesaid lugs 19 and whereby the ring 14 is held immovable with respect to the collar 12.

As a means for operating the spring ring so as to cause it to grip the hub 10 there is provided a lever 20 having an integral journal comprising three portions, two of which 21 and 22 are coaxial and are fitted in the aforesaid bores 15' and 16', respectively. The third or intermediate portion 23 of said lever journal is eccentric to the other two portions as indicated in Fig. 2. The lever 20 has an arm 20' projecting spirally from the journal and inwardly toward the shaft B when the clutch is in loose position, said arm 20' being held in such position by virtue of a coil spring 24 seated in a socket 25 in the collar 12 at one end and bearing with its other end against an extension 20'' of the lever on the opposite side of the journal member from the arm 20'. The eccentric 23 lies normally in the space between the ears 15 and 16 and the diameter thereof is such that the entire member 20 may be slipped into place by the eccentric passing through the bore 15'. A bolt 26 is passed through the bore 17' and is provided at one end with an eye 26' concentric with the eccentric 23. The opposite end of the bolt is provided with a pair of lock nuts 27 having bearing against the rounded outer face of the hub 17. The bore 17' is sufficiently larger than the bolt 26 to permit oscillation of the bolt therein. A cone 28, slidable on the shaft B by means of a yoke 29 of any suitable character, causes the outer or free end of the arm 20' to be lifted with respect to the shaft B, but causing the eccentric 23 to be thrown away from the hub 17 and thereby causing the split ring to grip the hub 10.

In the modification shown in Fig. 4 the clutch ring 14ᵃ is formed on its outer surface substantially circular so as to coöperate with the inner surface of a hollow hub or pulley. The ring 14ᵃ in this form of the invention is designed to operate in substantially the same manner as the ring 14 above described, but the eccentric 23ª is extended inwardly toward the axis of the shaft instead of outwardly, whereby when the lever 20 is thrown outwardly by operation of the cone as in the preceding example the effect of the eccentric will be to separate or spread the ends of the split ring causing the outer surface of the ring to forcibly grip the hollow hub. The eccentric 23ª is engaged by the eye bolt 26ª, but in this form of invention the adjustable lock nuts 27 are arranged between the hub 17ª and the eccentric. Upon withdrawing the cone 28 the elasticity of the ring and the force of the spring 24 will release the ring 14ª from the surface designed to coöperate therewith. That portion of the ring 14ª diametrically opposite the split ends may be enlarged or widened inwardly, as indicated at 14ᵇ, if desired for the purpose of counterbalancing the operating devices adjacent said split ends. The lugs 19ª are of course attached to said widened portion of the split ring and are arranged within the circumference thereof so as not to interfere with the application of the ring 14ª to the hollow hub.

The modification shown in Fig. 5 is one in which the clutch ring and collar are cast as one integral member. This form of the invention is preferable under certain circumstances in actual practice, but in its general features it embodies the same principles of operation as previously set forth.

I claim:—

1. In a friction clutch, the combination with a pair of shafts, of a hub rigidly connected to one of said shafts and including a cylindrical clutch member, a spring clutch ring surrounding said cylindrical clutch member, said ring being provided with a pair of spaced eyes having coaxial bores of different diameters, and a lug having a bore directed toward the space between said eyes, a collar connected to the other shaft and lying against the aforesaid hub, said clutch ring and collar having interlocking means, an operating lever having a pair of journals of different diameters mounted in the aforesaid eye bores and an integral eccentric lying between said eyes, a bolt having at one end an eye concentric with said eccentric and coöperating at its other end with the said lug, and means to operate said lever.

2. In a friction clutch, the combination with a pair of shafts, a hub rigidly connected to one of said shafts and receiving the end of the other shaft, a split clutch ring surrounding said hub for clutching coöperation therewith, a collar connected to the second shaft, said ring and collar having interlocking means to cause the ring to be immovable with respect to the collar, said ring being provided adjacent to one end with a pair of eyes and at its other end with a lug opposite the space between said eyes, an operating lever journaled in said eyes and having an eccentric portion between said eyes, said lever having at one end a radial and inwardly extending arm and at its other end having an extension, a spring located between said extension and said collar, a bolt mounted upon said eccentric and coöperating with said oppositely disposed lug, and means to rock said lever by contact with its radial arm and against the tension of said spring.

3. In a friction clutch, the combination with a hub and a spring ring coöperating therewith, of an operating lever comprising a journal member having two coaxial journal portions of different diameters and an eccentric portion between said journal portions, means connected to said eccentric portion for controlling the gripping operation of the ring, and means to rotate said lever to cause the effective operation of the eccentric lever.

4. In a friction clutch, the combination with a pair of shafts, of a hub rigidly connected to one of said shafts and including a cylindrical clutch member, a spring clutch ring surrounding said cylindrical clutch member, said ring being provided with a pair of spaced eyes having coaxial bores of different diameters, and a lug having a bore directed toward the space between said eyes, a collar connected to the other shaft and connected to said clutch ring, an operating lever having a pair of journals of different diameters mounted in the aforesaid eye bores and an integral eccentric lying between said eyes, a bolt having at one end an eye concentric with said eccentric and coöperating at its other end with the said lug, and means to operate said lever.

In testimony whereof I affix my signature in presence of two witnesses.

ALBERT MASTER.

Witnesses:
  Mrs. ALBERT MASTER,
  FREDERICK J. TRIMBLE.

---

Copies of this patent may be obtained for five cents each, by addressing the "Commissioner of Patents, Washington, D. C."